United States Patent [19]
Kappel et al.

[11] Patent Number: 5,995,459
[45] Date of Patent: Nov. 30, 1999

[54] FLIPPER MECHANISM FOR DOUBLE-SIDED MEDIA

[75] Inventors: Glen D. Kappel, Eagan; Robert J. McPherson, Eden Prairie, both of Minn.

[73] Assignee: International Data Engineering, Inc., Eden Prairie, Minn.

[21] Appl. No.: 09/238,111

[22] Filed: Jan. 27, 1999

Related U.S. Application Data

[63] Continuation-in-part of application No. 08/774,207, Nov. 5, 1996.

[51] Int. Cl.$^6$ .................................................. G11B 17/22
[52] U.S. Cl. ............................................. 369/36; 369/178
[58] Field of Search .................................. 369/34, 36, 38, 369/178, 191–194

[56] References Cited

U.S. PATENT DOCUMENTS

| | | |
|---|---|---|
| 3,831,197 | 8/1974 | Beach et al. . |
| 3,865,228 | 2/1975 | Hufford . |
| 4,271,440 | 6/1981 | Jenkins et al. . |
| 4,504,936 | 3/1985 | Faber et al. . |
| 4,607,354 | 8/1986 | Ishibashi et al. . |
| 4,608,679 | 8/1986 | Rudy et al. . |
| 4,614,474 | 9/1986 | Sudo . |
| 4,654,727 | 3/1987 | Blum et al. . |
| 4,675,856 | 6/1987 | Rudy et al. . |
| 4,690,602 | 9/1987 | Castaldi et al. . |
| 4,690,611 | 9/1987 | Nobuhara . |
| 4,691,299 | 9/1987 | Rivest et al. . |
| 4,710,797 | 12/1987 | Tanaka . |
| 4,742,504 | 5/1988 | Takasuka et al. . |
| 4,754,397 | 6/1988 | Varaiya et al. . |
| 4,787,074 | 11/1988 | Deck et al. . |
| 4,787,310 | 11/1988 | Tiemann . |
| 4,815,055 | 3/1989 | Fago, Jr. . |
| 4,815,056 | 3/1989 | Toi et al. . |
| 4,817,070 | 3/1989 | Hug et al. . |
| 4,817,071 | 3/1989 | Carlson et al. . |
| 4,827,463 | 5/1989 | Motoyoshi et al. . |
| 4,839,758 | 6/1989 | Honjoh . |
| 4,846,619 | 7/1989 | Crabtree et al. . |
| 4,852,075 | 7/1989 | Feyrer et al. . |
| 4,853,916 | 8/1989 | Tomita . |
| 4,878,137 | 10/1989 | Yamashita et al. . |
| 4,910,675 | 3/1990 | Burns et al. . |
| 4,912,580 | 3/1990 | Hanson . |

(List continued on next page.)

FOREIGN PATENT DOCUMENTS

| | | |
|---|---|---|
| 280263A2 | 8/1998 | European Pat. Off. . |
| 3710650 A1 | 10/1988 | Germany . |
| 59-30263 | 2/1984 | Japan . |
| 59-36003 | 2/1984 | Japan . |
| 59-231763 | 12/1984 | Japan . |
| 61-240474 | 10/1986 | Japan . |
| 1-50275 | 2/1989 | Japan . |
| 2-292150 | 12/1990 | Japan . |
| 405282764 | 10/1993 | Japan . |
| 1014788 | 4/1983 | U.S.S.R. . |

*Primary Examiner*—William J. Klimowicz
*Attorney, Agent, or Firm*—Mackall, Crounse & Moore, PLC

[57] ABSTRACT

A data media storage library for storing and accessing storage media such as optical discs, CDs, tape cartridges, and PCMCIA cards, consisting of a housing containing a storage array with a number of storage locations therein; a number of media storage elements for holding the storage media; a number of data transfer elements for reading and writing information on the storage media; and a media transport element for moving the storage media between the media storage elements and the data transfer elements. Each storage location may engage one of the media storage elements and data transfer elements, thereby allowing the interchangeability of media storage elements with data transfer elements within the storage array. A second embodiment includes a flipper mechanism for dual-sided media which can be mounted at one or more of the storage locations and rotate to flip the storage media to its other side.

12 Claims, 11 Drawing Sheets

U.S. PATENT DOCUMENTS

| | | |
|---|---|---|
| 4,912,581 | 3/1990 | Watanabe . |
| 4,939,713 | 7/1990 | Satoh et al. . |
| 4,953,122 | 8/1990 | Williams . |
| 4,998,232 | 3/1991 | Methlie et al. . |
| 5,001,582 | 3/1991 | Numasaki . |
| 5,010,536 | 4/1991 | Wanger et al. . |
| 5,014,255 | 5/1991 | Wanger et al. . |
| 5,033,038 | 7/1991 | Kobayashi et al. . |
| 5,036,503 | 7/1991 | Tomita . |
| 5,040,110 | 8/1991 | Miki et al. . |
| 5,040,159 | 8/1991 | Oliver et al. . |
| 5,043,962 | 8/1991 | Wanger et al. . |
| 5,056,073 | 10/1991 | Fitzgerald et al. . |
| 5,060,211 | 10/1991 | Blanding . |
| 5,062,093 | 10/1991 | Christie et al. . |
| 5,065,379 | 11/1991 | Smith et al. . |
| 5,101,387 | 3/1992 | Wanger et al. . |
| 5,123,000 | 6/1992 | Fitzgerald et al. . |
| 5,150,341 | 9/1992 | Shibayama . |
| 5,153,862 | 10/1992 | Taylor et al. . |
| 5,206,845 | 4/1993 | Baxter et al. . |
| 5,213,463 | 5/1993 | Rothlisberger et al. . |
| 5,220,548 | 6/1993 | Nakatsukasa et al. . |
| 5,228,016 | 7/1993 | Menke . |
| 5,231,552 | 7/1993 | Schneider et al. . |
| 5,233,576 | 8/1993 | Curtis et al. . |
| 5,255,251 | 10/1993 | Fitzgerald et al. . |
| 5,265,078 | 11/1993 | Akiyama et al. . |
| 5,276,675 | 1/1994 | Wanger et al. . |
| 5,280,467 | 1/1994 | Wanger et al. . |
| 5,345,350 | 9/1994 | Ellis et al. . |
| 5,360,651 | 11/1994 | Baxter et al. . |
| 5,362,192 | 11/1994 | Dang . |
| 5,377,121 | 12/1994 | Dimitri et al. . |
| 5,431,520 | 7/1995 | Brugger . |
| 5,446,857 | 8/1995 | Russ . |
| 5,471,561 | 11/1995 | Cowgill et al. . |
| 5,502,697 | 3/1996 | Taki . |
| 5,546,366 | 8/1996 | Dang . |
| 5,602,821 | 2/1997 | McPherson et al. . |
| 5,764,615 | 6/1998 | Ware et al. . |
| 5,798,997 | 8/1998 | Ware et al. . |
| 5,813,009 | 9/1998 | Johnson et al. . |

FLIPPER MECHANISM FOR DOUBLE-SIDED MEDIA

This application is a continuation-in-part of co-pending Ser. No. 08/744,207, filed Nov. 5, 1996 pending.

BACKGROUND OF THE INVENTION

Storage media library systems (jukeboxes) are devices which contain multiple storage media drives and many pieces of storage media to accommodate installations requiring access to large numbers of storage media, such as optical discs, compact discs and tape cartridges. The storage media may be housed in magazines which contain a fixed number of storage media. Existing storage media library systems are configured to contain a fixed number of magazines and a fixed number of drives.

Typically, a customer will make a purchase decision based on drive or media capacity. If a jukebox will only handle a maximum number of drives or media, and still not meet the customer requirements, then a larger jukebox is required. Some customers will require a larger ratio of drives to media and some will require the opposite. This may demand the selection of a jukebox which is much larger than needed in order to fulfill the specific needs of the customer.

There is a need for a data media storage library with a fixed number of homogeneous 'slots' which can be populated with either drives or storage media. This allows for customization of a library system which meets the specific requirements of the end user. The customer can opt to swap drives for media to tailor the jukebox to their needs, and minimize the necessity to purchase a larger system with capabilities they may not fully realize. This allows for easy future expansion if needed.

SUMMARY OF THE INVENTION

A data media storage library for storing and accessing storage media such as optical discs, CDs, tape cartridges, and PCMCIA cards, consisting of a housing containing a storage array with a number of storage locations therein; a number of media storage elements for holding the storage media; a number of data transfer elements for reading and writing information on the storage media; and a media transport element for moving the storage media between the media storage elements and the data transfer elements. Each storage location may engage one of the media storage elements and data transfer elements, thereby allowing the interchangeability of media storage elements with data transfer elements within the storage array. A second embodiment includes a flipper mechanism for dual-sided media which can be mounted at one or more of the storage locations and rotate to flip the storage media to its other side.

A principal object and advantage of the present invention is that it provides a data media storage library with a fixed number of homogeneous 'slots' which can be populated with either drives or storage media. This allows for customization of a library system which meets the specific requirements of the end user. The customer can opt to swap drives for media to tailor the jukebox to their needs, and minimize the necessity to purchase a larger system with capabilities they may not fully realize. This allows for easy future expansion if needed.

A second principal object and advantage of the present invention is that it allows for a drive to be removed from the data storage library while power is on, that is, it allows the drive to be "hot swapped", which is now a serviceability requirement in the industry.

Another object and advantage of the present invention is that it provides a drive assembly which contains a quick release fastening mechanism to simplify the installation and removal of drives. Installation of drives is achieved by simply pushing the assembly into a slot until the spring-loaded latch engages. Actuation of the latch mechanism is all that is required to disengage a drive from the jukebox.

A feature of the invention is that the media storage element and the data transfer element both have the same width and height, so that a given slot can hold either one.

Another object and advantage of the present invention is that includes a flipper mechanism that can be mounted at one of the storage locations that can be used to flip the storage media to its other side for reading. The flipper mechanism can be added as a replaceable part at one of the storage locations and provide dual sided media access without modifying any other components of the data media storage library.

DETAILED DESCRIPTION OF THE PREFERRED EMBODIMENTS

Figure 1:
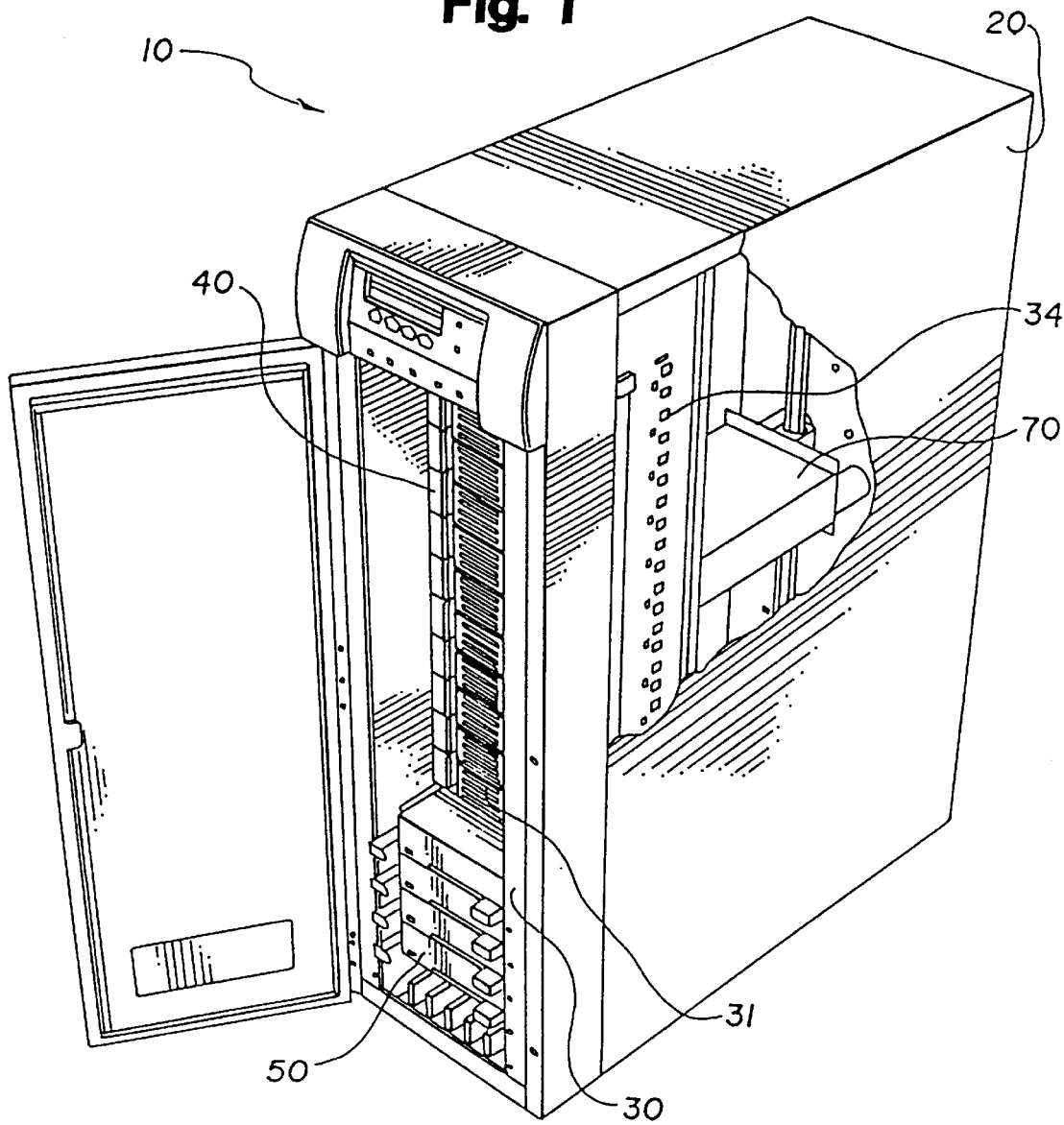
FIG. 1 is a front perspective view of the present invention.
Figure 2:
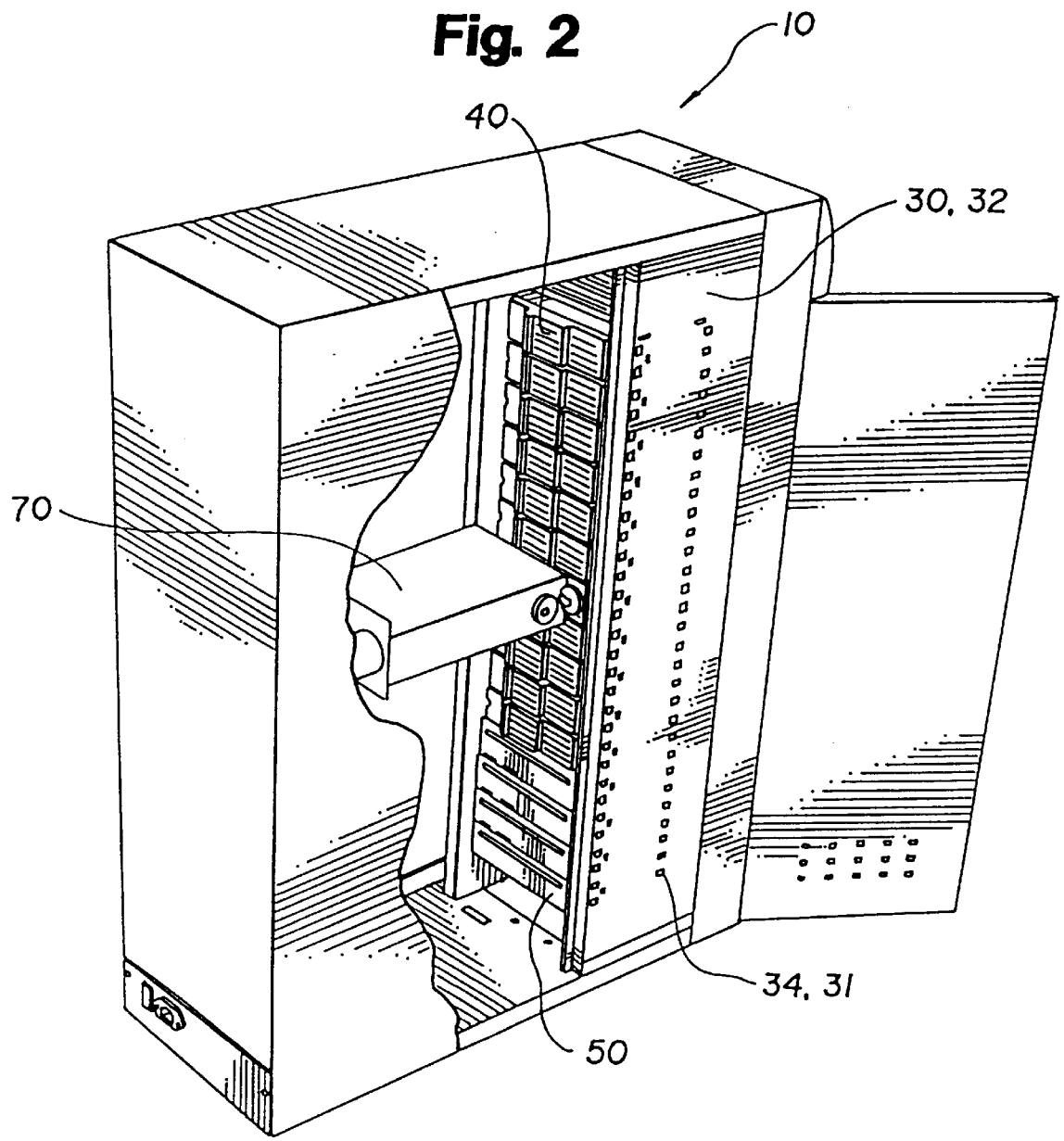
FIG. 2 is a rear perspective view of the present invention.
Figure 3:
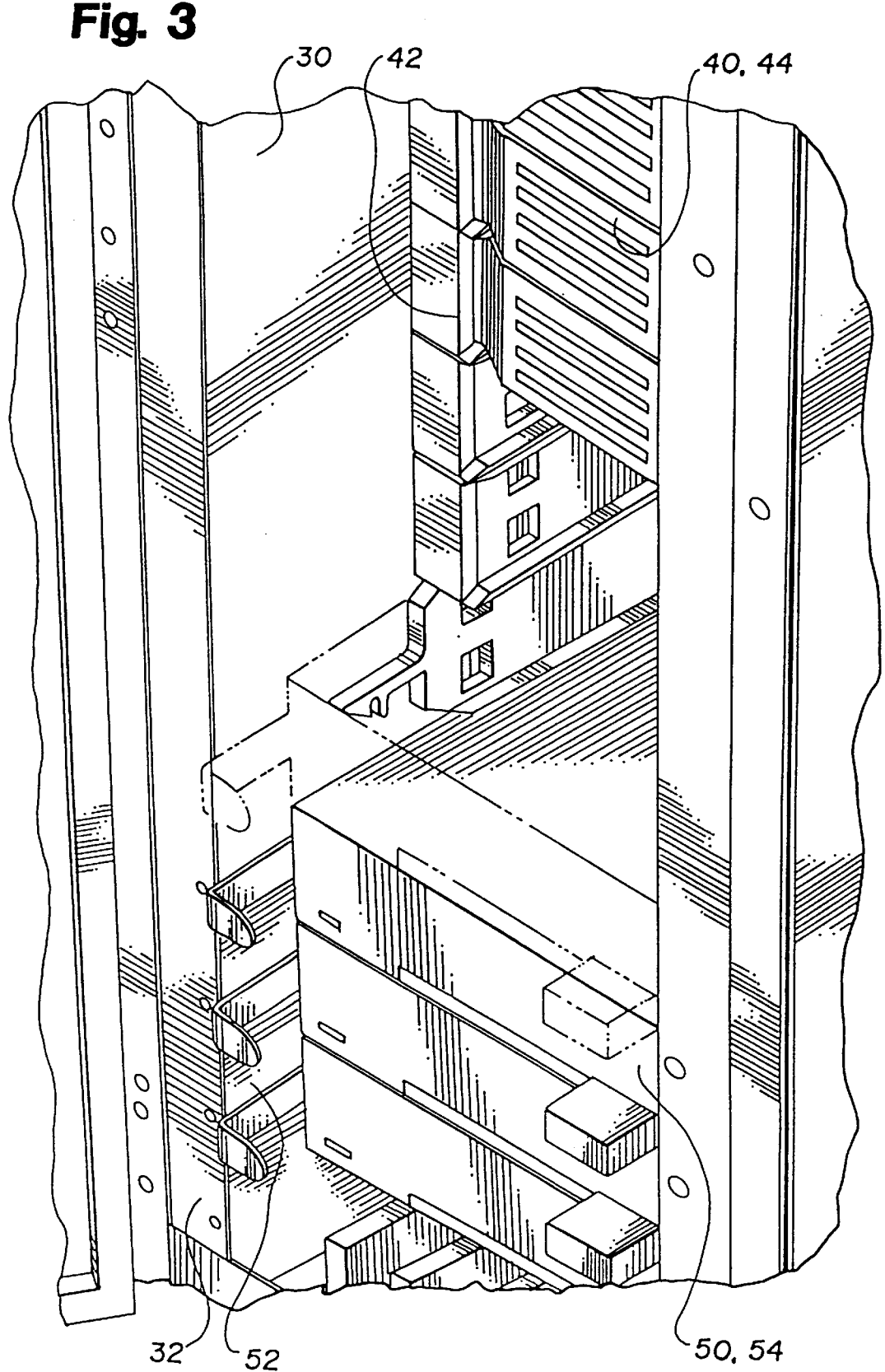
FIG. 3 is a detailed perspective view of the present invention.
Figure 4:
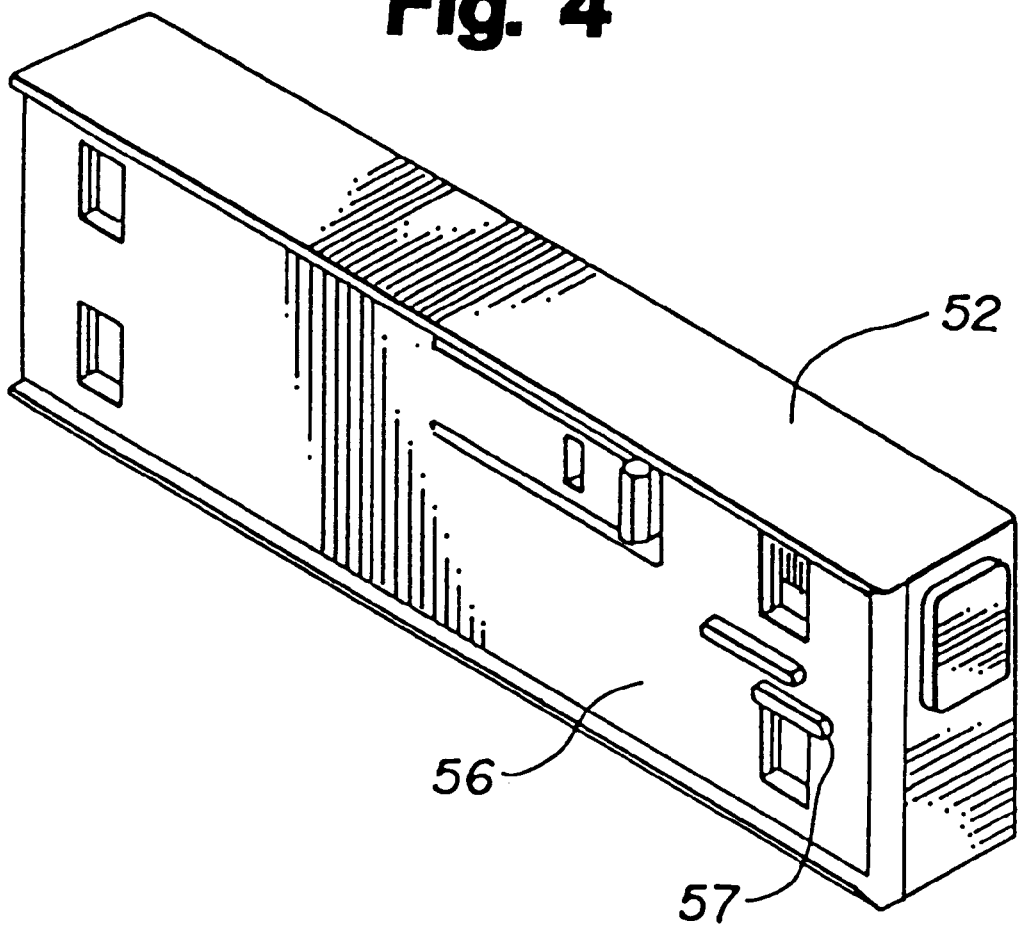
FIG. 4 is a detailed view of the data transfer element adapter.
Figure 5:
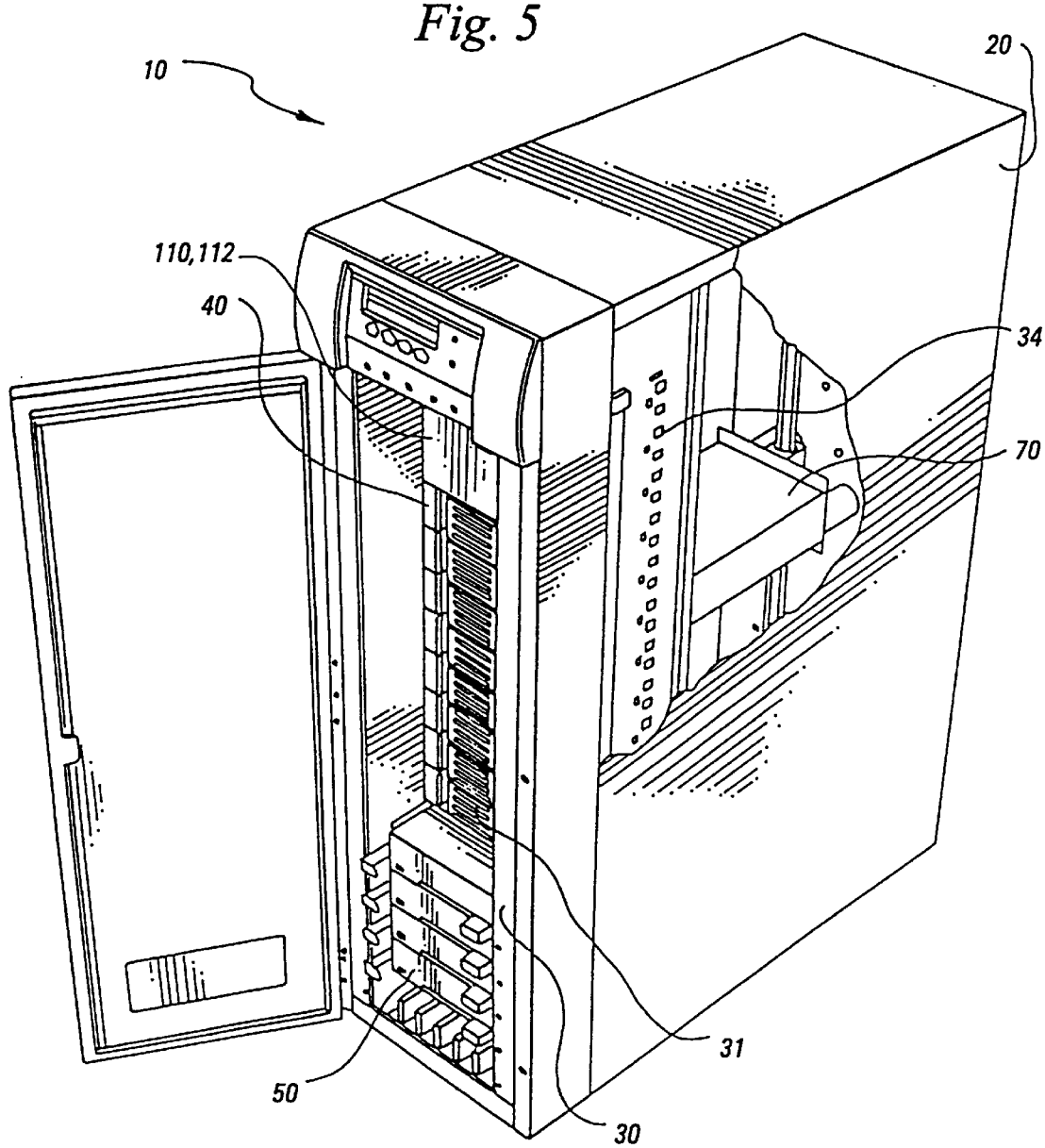
FIG. 5 is a front perspective view of a second embodiment of the present invention.
Figure 6:
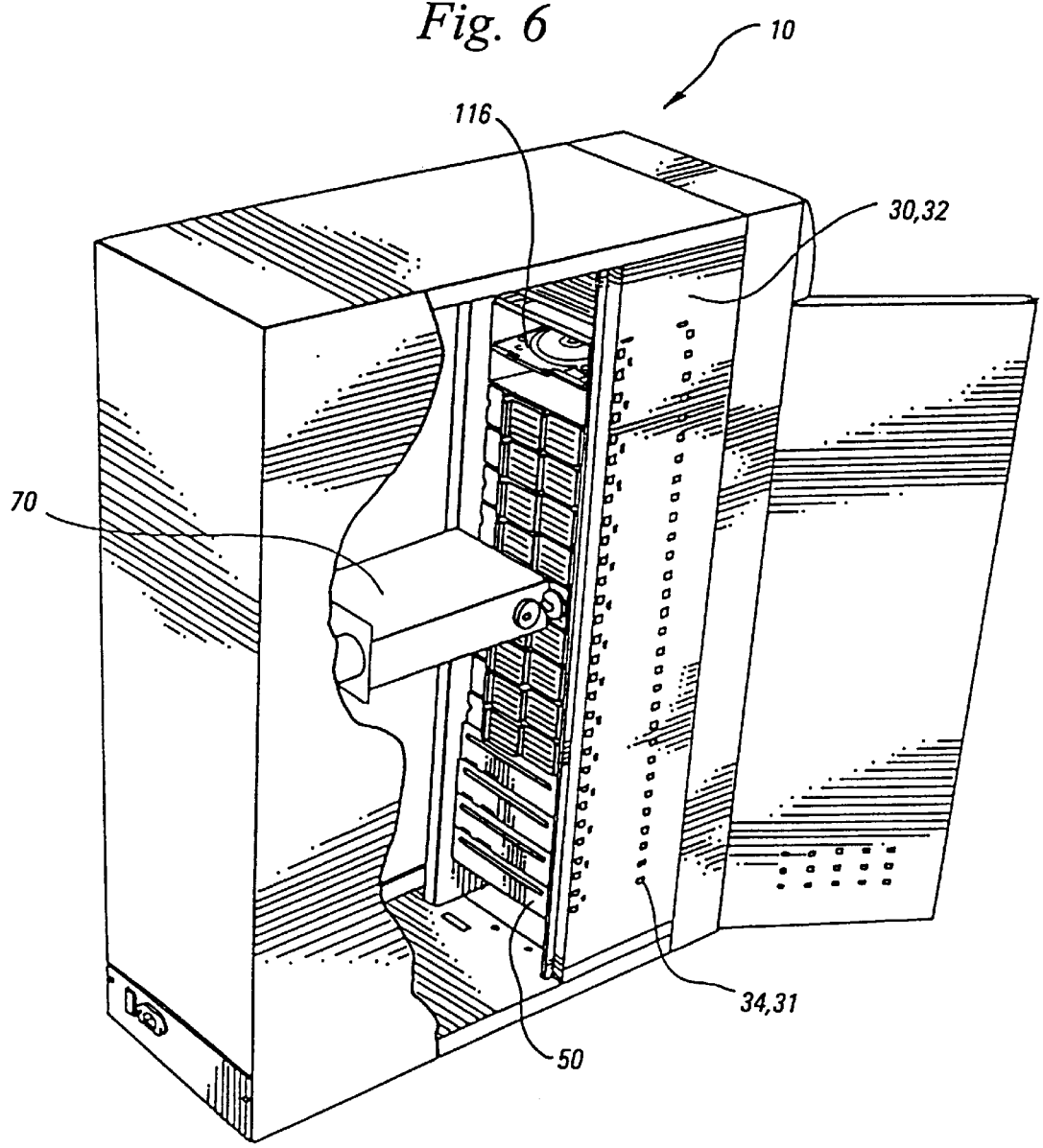
FIG. 6 is a rear perspective view of a second embodiment of the present invention.
Figure 7:
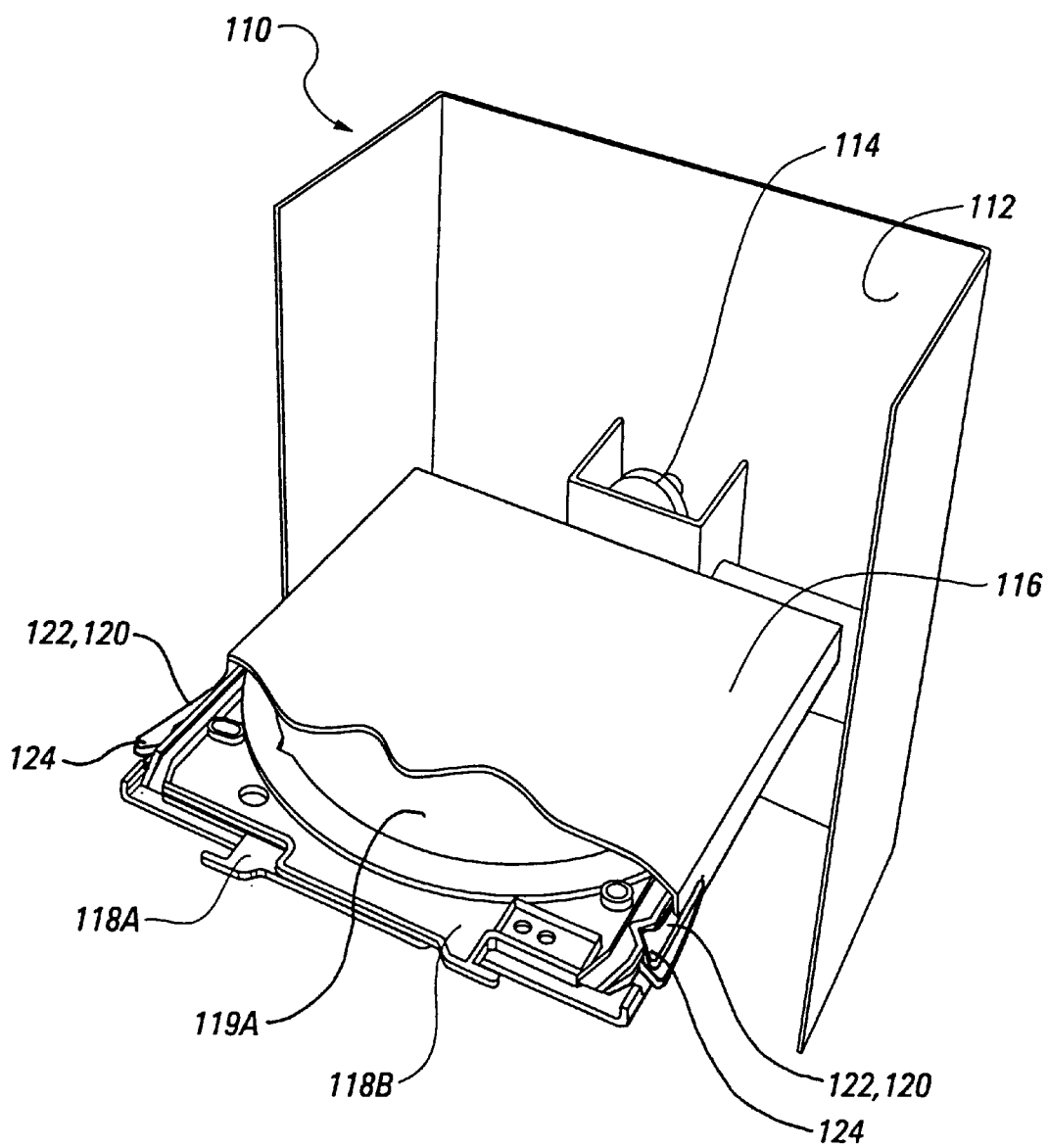
FIG. 7 is a perspective view of the flipper mechanism of the second embodiment of the present invention with an empty upper media tray and a lower media tray holding a compact disc.

The data storage library of the present invention is generally shown in the figures as reference numeral 10.

The data storage library 10 consists of a housing 20 which provides a protective environment for the other components of the data storage library 10.

Within the housing 20 is at least one storage array 30 which holds a number of other components in storage locations 31. Preferably, more than one storage array 30 is contained within the housing 20. In the preferred embodiment, the storage array 30 is a vertical column, but any other orientation or shape such as horizontal or polygonal is also possible.

Arranged within the storage array 30 is at least one and preferably several media storage elements 40. The media storage elements 40 hold the storage media when the storage media are not being read or written to. The storage media can be any media which can be used to record information, such as data and graphics. The recording means may be magnetic, optical, or any other equivalent recording means known in the storage media art. Preferably, the storage media are compact discs (CDs). Preferably, the media storage elements 40 are trays which hold the CDs.

Also arranged within the storage array 30 is at least one and preferably several data transfer elements 50, which are used to read and write information on the storage media. Preferably, the data transfer elements 50 are compact disc drives (CD drives) but the data transfer elements 50 may be any equivalent device such as an optical disc drive, a cassette drive, floppy disc drive or hard drive. The latest CD drives allow the CD to be written to as well as read from, in which case the media is called a PH. Such writable PDs are readily available, an example being the Panasonic LM-RP6500A PD.

A media transport element 70 is movable within the housing 20 to move the storage media among media storage elements 40 and data transfer elements 50 within a storage array 30, and also to move between storage arrays 30 when there is more than one storage array.

The data media storage library 10 may preferably include a store guide 32 within the storage array, the store guide 32 having slots 34. In the preferred embodiment, the store guide 32 is a pair of plastic molded rails attached to the storagre array 30. The slots 34 act as storage locations 31.

Preferably, the data media storage library 10 also comprises a number of media storage element adapter 42 which engage the store guide slots 34 and the media storage elements 40 to hold the media storage elements 40 in the slots 34 and allow the media storage elements 40 to be removed from the slots 34.

In the preferred embodiment, the media storage elements 40 are magazines 44 having a plurality of trays therein for holding compact discs (CDs).

Preferably, the data media storage library 10 also comprises a number of data transfer element adapters 52 which engage the store guide slots 34 and the data transfer elements 50 to hold the data transfer elements 50 in the slots 34 and allow the data transfer elements 50 to be removed from the slots 34.

In the preferred embodiment, the data transfer elements 50 are CD drives 54 and the data transfer element adapter further comprises a mounting plate 56 and latching mechanism 57, the latching mechanism 57 engaging the CD drive 54 and holding the CD drive 54 within the data transfer element adapter 52. Preferably, the latch mechanism 57 is spring-loaded.

To meet serviceability requirements, it is preferred that the data transfer elements 50 can be removed from the slots 34 while power is supplied to the library 10.

Preferably, the width of the media storage element 40 is substantially the same as the width of the data transfer element 50, and the height of the media storage element 40 is substantially the same as the height of the data transfer element 50, thereby allowing the interchangeability of media storage elements 40 and data transfer elements 50 in any given slot.

In operation, the user populates the slots 34 with the appropriate number of media storage elements 40 and data transfer elements 50 as needed by his application. When power is applied, the data media storage library 10 will determine, by appropriate means, whether a given slot is empty, contains a media storage element 40, or contains a data transfer element 50. Appropriate software executing in the data media storage library 10 determines which data transfer clement 50 is to be used or read or write to any given medium in a media storage element 40. The media transport element 70 will then move the medium between the appropriate medi a storage element 40 and data transfer element 50.

If the user wishes to remove a media storage element 40 or data transfer element 50, an appropriate software command is issued to the data media transfer library 10, the housing 20 is opened, and the media storage element 40 or data transfer clement 50 is removed from a slot 34. In the case of the data transfer element 50, removal maybe advantageously executed by releasing the latching mechanism 57.

A second embodiment of the present invention is shown in FIGS. 5–11.

A flipper mechanism 110 comprises a flipper chassis 112 which is adapted to be mounted at one or more of the storage locations 31. A flipper motor 114 is mounted on the flipper chassis.

A flipper cartridge 116 is connected to the flipper motor 114 and is rotationally driven by the flipper motor 114.

The flipper cartridge 116 comprises at least two storage media trays 118A, 118B contiguous to one another. One of the trays 118A, 118B holds a storage medium, such as a dual-sided compact disc (CD). The compact disc sits in a well or depression 119 in the tray. When two trays are present in the cartridge 116, the lover tray supports its media directly in the well or depression 119, while the upper tray is inverted with the back surface 119A of the well or depression 119 upwards.

Although not shown in the Figures, it will be clear that additional flipper cartridges 116 may be ganged together so that they are simultaneously rotated by the flipper motor 114.

The flipper cartridge 116 also preferably comprises a truly support member 120 which is adapted to support the upper media tray 118B within the flipper cartridge 116 when tile lower media tray 118A is removed from the flipper cartridge by the media transport element. The tray support member can have any appropriate shape, but in the preferred embodiment it is a tray support finger 122 having an elongate shape with a support tab 124 at one end. The tray support member 120 is pivotally mounted in the flipper cartridge 116 so that the tray support member 120 is deflected by the media tray 118A as the tray 118A enters the flipper cartridge 116 below the media tray 118B.

The flipper cartridge also preferably comprises a tray detent 126 which is adapted to retain the media trays 118A, 118B within the flipper cartridge 116 during rotation. Preferably, the support tab 124 of the support finger 122 acts as the detent, engaging the notch of each tray.

Operation of the flipper mechanism 110 is as follows.

Figure 8:
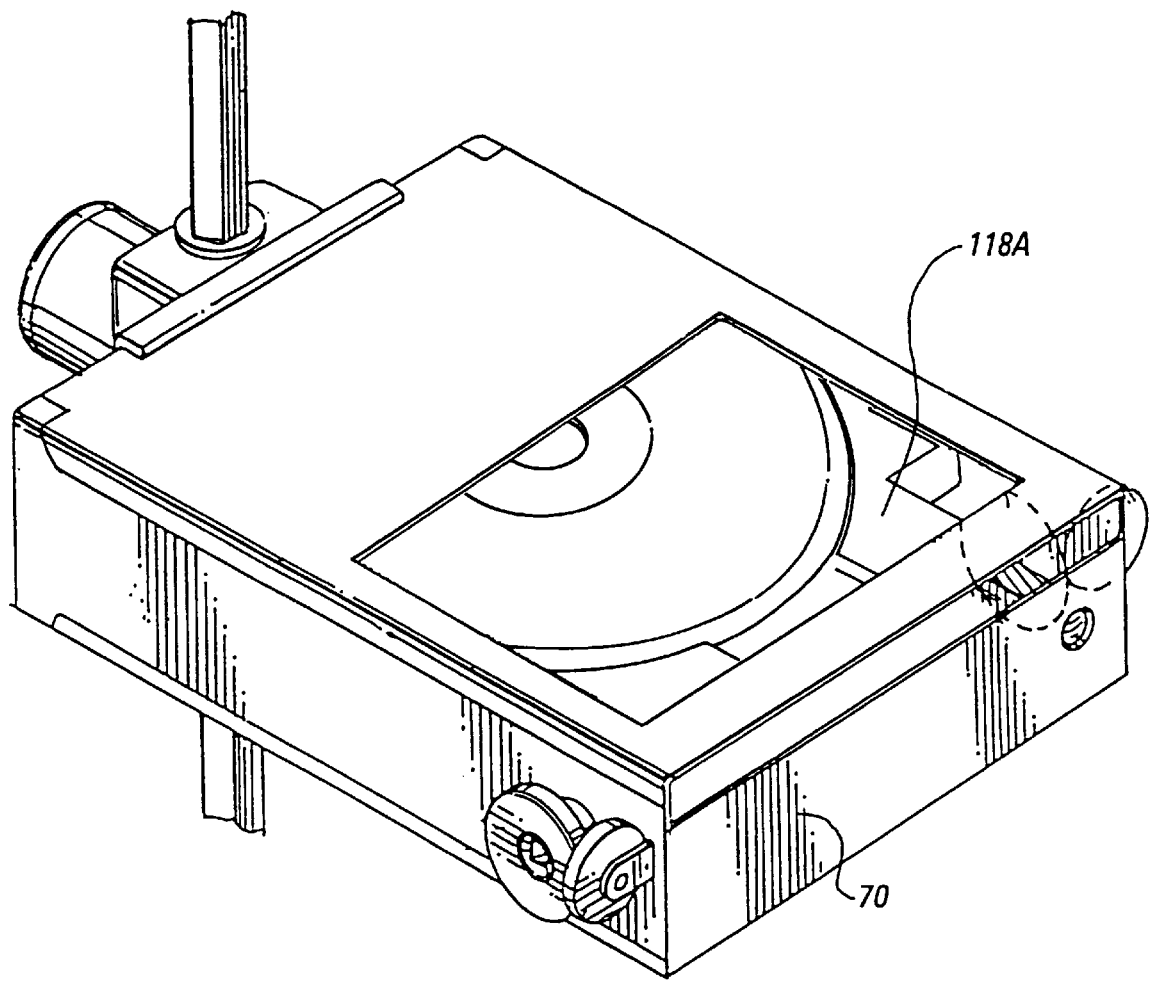
FIG. 8 is a perspective view of a media transport element with a media tray loaded therein.

First, the media transport element 70 receives a media tray 118A from either the media storage elements 40 or the data transfer elements 50. FIG. 8 shows the media tray 118A after it has been received into the media transport element 70.

In order to flip the medium to its other side, the media transport element 70 is then positioned adjacent the flipper mechanism 110 The media transport element 70 then inserts the media tray 118A into the flipper cartridge 116 below the upper tray 118B, which will be empty. As slowing in FIG.

Figure 9:
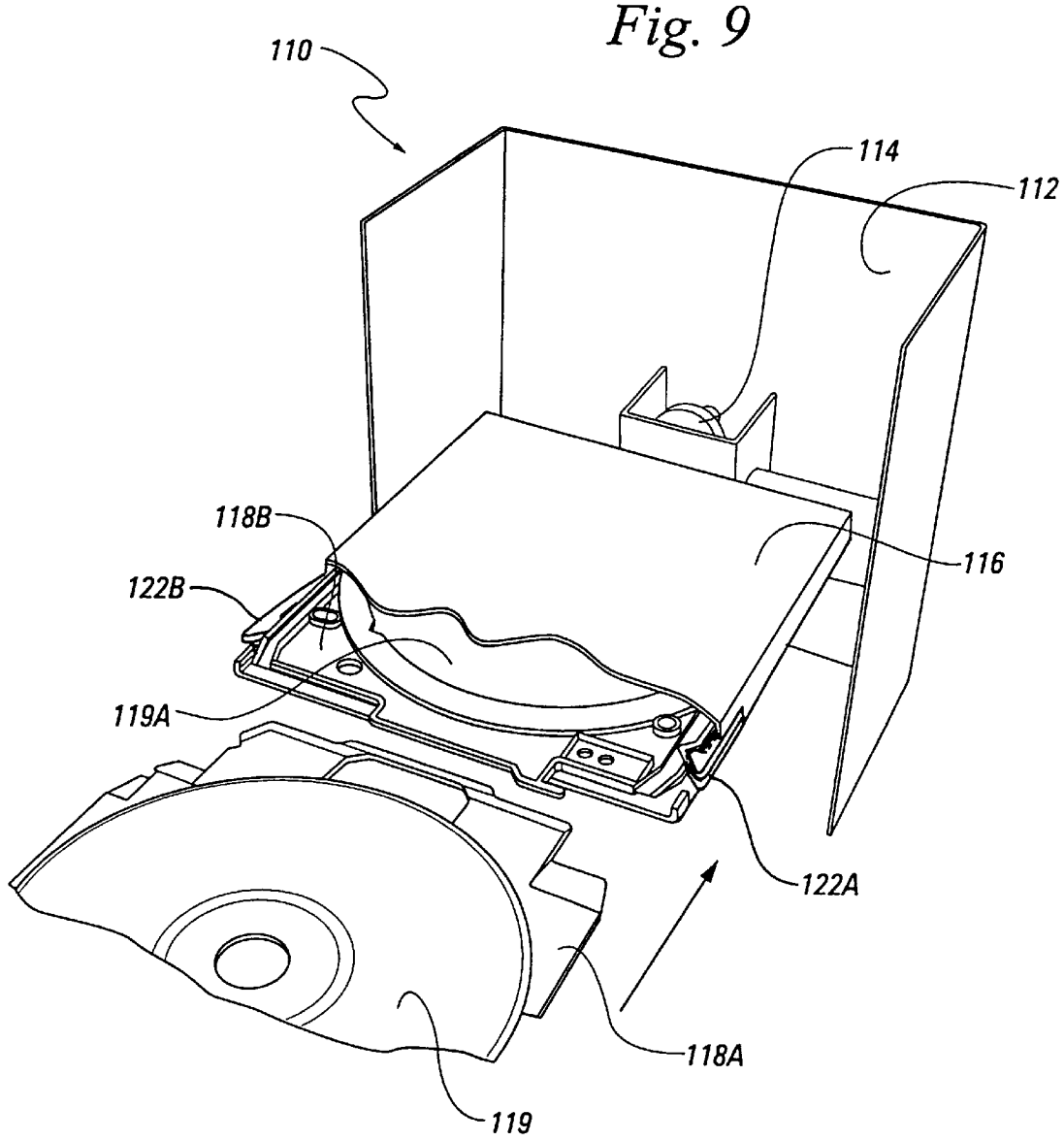
FIG. 9 shows a media tray 118A being inserted into the flipper mechanism of the second embodiment of the present invention below the empty tray 118B. The upper support finger 122B on the right side of the Figure has been cut away to show the lower tray support finger 122A supporting the upper tray.

9, the upper tray 118B will be supported by one of the lower support fingers 122A and one of the upper support fingers 122B will be engaging the notch of the upper tray 118B while the other upper support finger 122B is deflected (in FIG. 9, one upper support finger has been cut away to show the lower support finger).

As the lower media tray 118A centers the flipper cartridge, the lower tray support fingers 122A are deflected out of the way by the tray 118A, with one of the lower tray support fingers 122A engaging the notch of the lower tray 118A.

Figure 10:
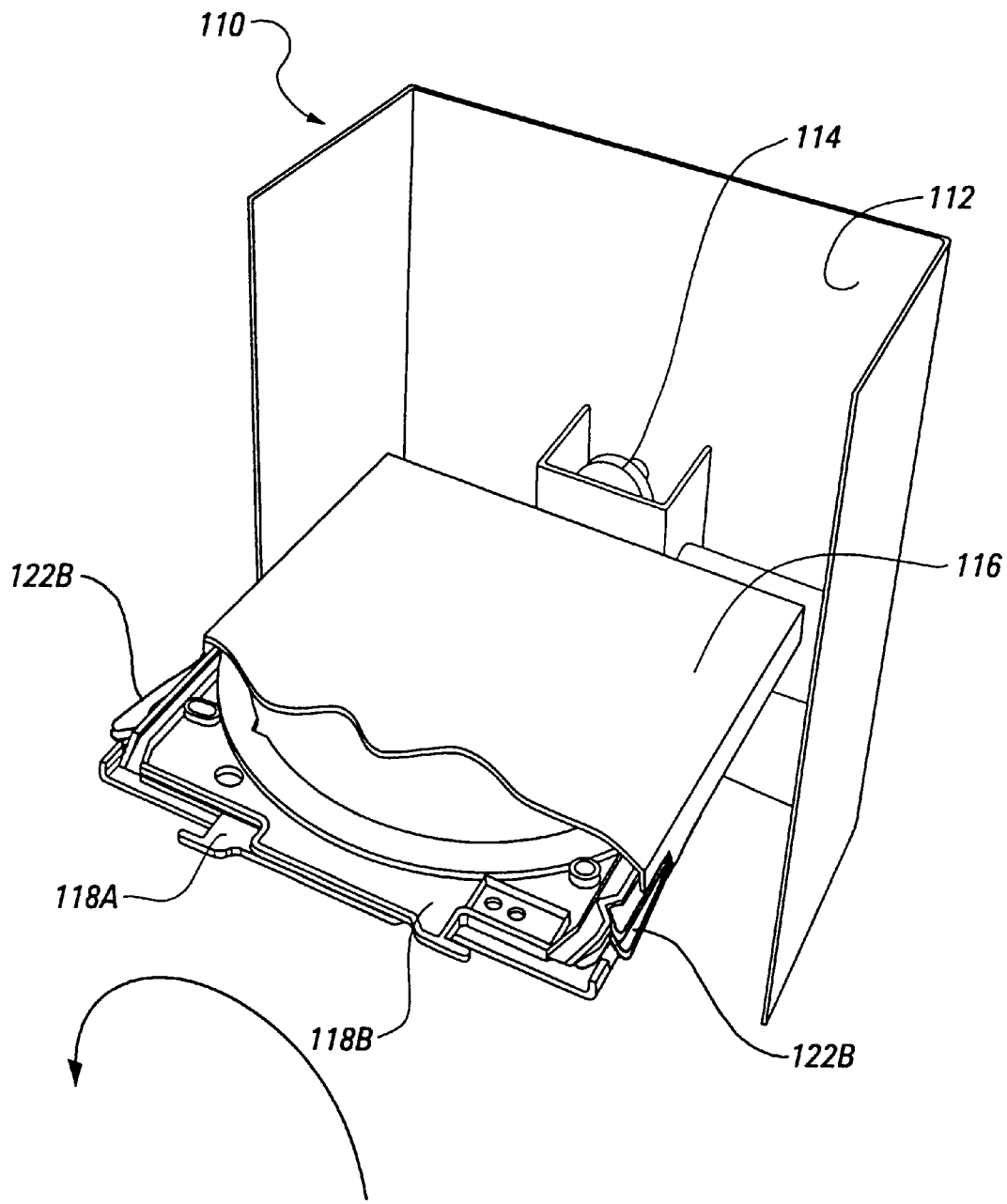
FIG. 10 shows rotation of the flipper mechanism of the second embodiment of the present invention to flip the media to the other side.

The flipper motor 114 is then activated, causing the flipper cartridge to rotate 180 degrees as shown by the arrow in FIG. 10. During rotation, the medium drops into the other, empty media tray 118B, with its other side presented for data transfer. Media tray 118B then becomes media tray 118A.

Figure 11:
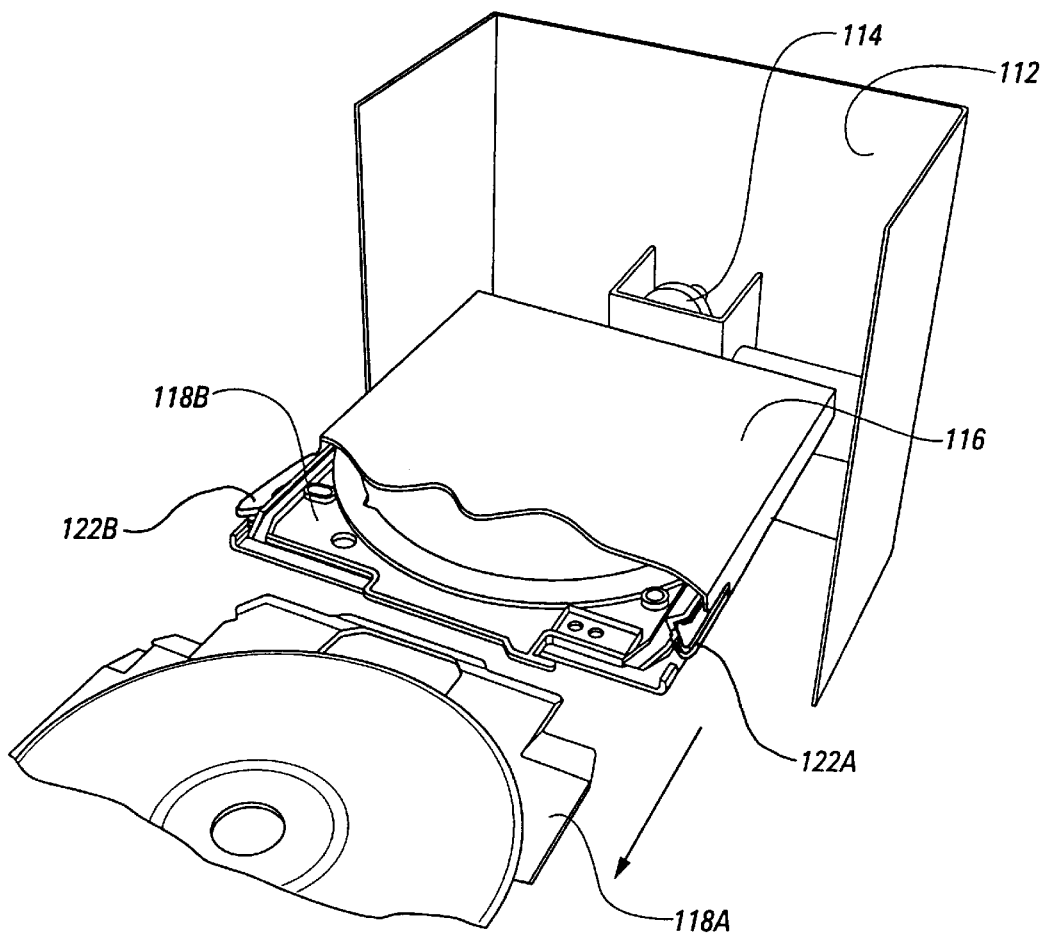
FIG. 11 shows a media tray 118A being withdrawn from the flipper mechanism of the second embodiment of the present invention. The upper support finger 122B on the right side of the Figure has been cut away to show the lower tray support finger 122A supporting the upper tray.

As shown in FIG. 11, the lower media tray 118A is then removed from the flipper cartridge by the media transport element 70 for presentation to one of the data transfer elements 50 for accessing, the other side of the medium. As the tray 118A leaves the flipper cartridge 116, the lower tray support flippers 122A deflect back into the flipper cartridge 116 to support the upper media tray 113.

It will be clear that operation of the flipper mechanism 110 can now continue when another media tray is inserted into the flipper cartridge 116 below upper media tray 118B, which is now empty.

The present invention maybe embodied in other specific forms without departing from tile spirit or essential attributes thereof, aid it is therefore desired that the present embodiment be considered in all respects as illustrative and not restrictive, reference being made to the appended claims rather than to the foregoing description to indicate the scope of the invention.

What is claimed:

1. In a data media storage library for storing and accessing storage media, the storage media being double-sided compact discs, the data media storage library having a housing, a storage array within the housing including a number of storage locations, a plurality of media storage elements adapted to hold the storage media, a plurality of data transfer elements adapted to read and write information on the storage media, and a media transport element within the housing adapted to move the storage media between the media storage clement and the data transfer element, a flipper mechanism comprising:

(a) a flipper chassis adapted to be mounted at one or more of the storage locations;
    (b) a flipper motor mounted on the flipper chassis; and
    (c) a flipper cartridge connected to the flipper motor and adapted to hold an upper media tray and a lower media tray contiguous to one another and a storage medium in the lower tray, the upper tray being empty, whereby the flipper cartridge may be rotated by at least 180 degrees by the flipper motor so that the storage medium drops into the upper tray with the second side of the storage medium available for reading by the data transfer element.

2. The flipper mechanism of claim 1, further comprising at least two flipper cartridges ganged together, all of the flipper cartridges being simultaneously rotated by the flipper motor.

3. The flipper mechanism of claim 1, further comprising a tray detent within the flipper cartridge adapted to retain the trays within the flipper cartridge during rotation.

4. The flipper mechanism of claim 3, further comprising a tray support member within the flipper cartridge adapted to support the upper tray when the lower tray is removed from the flipper cartridge by the media transport element.

5. The flipper mechanism of claim 4, wherein the tray detent is the tray support member and the tray detent engages a notch on the upper media tray and the lower media tray.

6. The flipper mechanism of claim 4, wherein the tray support member is pivotally mounted in the flipper cartridge so that the tray support member is deflected by the lower tray as the lower tray enters the flipper cartridge.

7. The flipper mechanism of claim 6, wherein the tray support member further comprises an elongate tray support finger with a support tab at one end.

8. In a data media storage library for storing and accessing storage media, the storage media being double-sided compact discs, the data media storage library having a housing, a storage array within the housing including a number of storage locations, a plurality of media storage elements adapted to hold the storage media, a plurality of data transfer elements adapted to read and write information on the storage media, and a media transport element within the housing adapted to move the storage media between the media storage element and the data transfer element, a method of flipping the storage media to present the second side to the data transfer element, comprising the steps of:

(a) mounting a flipper chassis at one or more of the storage locations, the flipper chassis having a flipper motor and having a nipper cartridge connected to the flipper motor, the flipper cartridge adapted to hold an upper tray and a lower tray contiguous to one another, the upper tray being initially empty;
    (b) activating the media transport element to insert a lower tray in the flipper cartridge below the empty upper tray;
    (c) activating the flipper motor to rotate the flipper cartridge by at least 180 degrees so the storage medium drops into the empty upper tray, the upper tray becoming the lower tray; and
    (d) activating, the media transport element to withdraw the lower tray from the flipper cartridge with the second side of the storage medium available for presentation to the data transfer element.

9. The method of claim 8, further comprising the step of deflecting a tray support member by the lower tray at step (b).

10. The method of claim 9, further comprising the step of gripping the upper tray and lower tray by tray detents.

11. The method of claim 10, wherein the tray support member acts as the tray detent.

12. The method of claim 8, further comprising the step of connecting more than one flipper cartridge to the flipper motor.

* * * * *

UNITED STATES PATENT AND TRADEMARK OFFICE
CERTIFICATE OF CORRECTION

PATENT NO. : 5,995,459
DATED : November 30, 1999
INVENTOR(S) : Glen D. Kappel; Robert J. McPherson It is certified that error appears in the above-identified patent and that said Letters Patent is hereby corrected as shown below:

Title page,
Under Related U.S. Application Data, delete "08/774,207" and insert -- 08/744,107 --.

Column 1,
Line 2, delete "08/744,207" and insert -- 08/744,107 --.

Column 3,
Line 31, delete "storagre" and insert -- storage --.

Column 4,
Line 40, delete "truly" and insert -- tray.
Line 42, delete "tile" and insert -- the --.
Line 67, delete "slowing" and insert -- shown --.

Column 5,
Line 7, delete "centers" and insert -- enters --.
Line 22, delete "113" and insert -- 118B --.
Line 28, delete "tile" and insert -- the --.
Line 29, delete "aid" and insert -- and --.

Column 6,
Line 33, delete "nipper" and insert -- flipper --.

Signed and Sealed this

Eighteenth Day of September, 2001

Attest:

*Nicholas P. Godici*

NICHOLAS P. GODICI
*Attesting Officer*   *Acting Director of the United States Patent and Trademark Office*